United States Patent Office 3,084,193
Patented Apr. 2, 1963

3,084,193
PREPARATION OF TROPOLONES FROM 2-HALOTROPONES
Arne P. ter Borg and Robert van Helden, both of Amsterdam, Netherlands, assignors to Shell Oil Company, New York, N.Y., a corporation of Delaware
No Drawing. Filed June 8, 1960, Ser. No. 34,608
Claims priority, application Netherlands Dec. 15, 1959
5 Claims. (Cl. 260—586)

This invention relates to a process for the production of tropolones from 2-halotropones. More particularly, it relates to such a process wherein the tropolone is prepared by reacting a 2-halotropone with formic acid and water.

Previous attempts at preparing tropolones have met with varying degrees of success but none have achieved a simple method suitable for a commercial operation. These prior methods have either employed starting materials that are not readily available or have led to undesirable by-products accompanied by commercially unacceptable low yields. Typical of the prior methods are the following: bromination of cycloheptane-1,2-dione to give bromotropolone followed by catalytic reduction to tropolone, hydrolysis of a tetrafluoroethylene-cyclopentadiene adduct to tropone, and conversion of tropone to 2-aminotropone with hydroxylamine and hydrolysis with alkali of that product to tropolone in addition to other products.

The present invention provides a simple yet highly efficient process for preparing tropolones in exceptionally high yield. The starting 2-halotropone material is readily available by the route taught by copending applications Serial No. 34,607 filed June 8, 1960, and Serial No. 34,609, filed June 8, 1960. These copending applications teach the oxidation of a cycloheptatriene in acid medium to produce a tropylium salt. The tropylium salt is then hydrolyzed to an ether and thermally cleaved to produce a tropone. The tropones are then chlorinated to provide the necessary 2-halotropones for use in this invention.

The tropolones produced by the process of this invention show useful biological properties and tropolone itself may be used as a metal deactivator in motor fuels and rubbers. (See U.S. Patent No. 2,770,546.)

The present invention provides a process for the production of tropolones which comprises heating a 2-halotropone in a solution comprising formic acid and water. This conversion is almost quantitative except for the separation of a small quantity of higher molecular weight material.

Any 2-halotropone may be used as a starting material in this process. Thus 2-chlorotropones, 2-bromotropones, 2-iodotropones, and 2-fluorotropones are all suitable starting materials, although 2-chlorotropones are preferred owing to their availability.

The 2-halotropone may be substituted or unsubstituted on the remaining carbon atoms of the tropone ring. Suitable substituents on the tropone ring include alkyl radicals, aryl radicals, aralkyl radicals, alkaryl radicals and cycloalkyl radicals, among others, wherein each substituent my contain, for example, up to about ten carbon atoms.

When one of these substituted 2-halotropones is selected as a starting material, the product of the process of this invention will, of course, be a correspondingly substituted tropolone. The following typical suitable starting materials will illustrate the types of substituted products obtainable:

3,5-dimethyl-2-chlorotropone→3,5-dimethyl tropolone
4-phenyl-2-chlorotropone→4-phenyl tropolone
3-methyl-5-cyclohexyl-2-chlorotropone→
    3-methyl-5-cyclohexyl tropolone
4-(p-methylphenyl)-2-chlorotropone→
    4-(p-methylphenyl) tropolone
6-(β-phenylpropyl)-2-chlorotropone→
    6-(β-phenylpropyl) tropolone Suitable starting materials may therefore be described as compounds having the structural formula

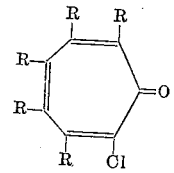

wherein each R is individually selected from the group consisting of the alkyl, aryl, alkaryl, aralkyl, and cycloalkyl radicals, and the hydrogen atom. It is preferred that each R is a hydrogen atom or an alkyl group having from 1 to 10 carbon atoms.

Although any of the foregoing types of substituted 2-halotropones may be used, it is preferred to use unsubstituted 2-halotropone as a starting material.

The reaction is carried out by heating the starting material in a solution comprising formic acid and a small quantity of water. While the concentration of water present may be varied over a considerable range, it is preferred that the water be present in a range from about 10% to about 50% by weight of the formic acid. The formic acid is preferably present in about 70% to 90% by weight of the solution. When the formic acid and water are present in this preferred range, the reaction takes place readily by boiling at atmospheric pressure with the production of exceptionally high yields of tropolones. However, other formic acid solutions containing a minor amount of water may be used as well as both super- and sub-atmospheric pressures at reaction temperature.

The tropolone may be recovered or purified by any appropriate technique. For example, the formic acid and water may be removed by distillation. The desired product may be obtained in pure form by addition of a strong inorganic base such as sodium hydroxide, which yields a salt such as the sodium salt of the tropolone. The desired product is liberated from this salt by acidification. Further purification may be achieved by extraction with an inert solvent such as diethyl ether, benzene, cyclohexane, octane, carbon tetrachloride, and the like. Details of the method of carrying out the process of this invention are best illustrated by reference to the following example. It is to be understood that this example is offered for illustrative purposes only and is not to be construed as limiting the invention in any respect.

Example 40.4 grams (0.29 mol) of 2-chlorotropone were dissolved in a mixture of 400 ml. of formic acid and 100 ml. of water. After boiling under reflux for 50 hours the solvent was distilled off at 80 mm. Hg and a bath temperature of 50° C. The residue was poured out into a solution of 200 g. of NaOH in 400 ml. of water. The yellow precipitate of sodium tropolonate was filtered, the sodium salt dissolved in 100 ml. of water and acidified to a pH=7. A small quantity of black tarry material was formed which was filtered. The light yellow filtrate was further acidified to a pH=3, and five times extracted with ether. The ether was dried over $Na_2SO_4$ and distilled off. The residue was distilled in vacuo.

Tropolone:
    Boiling point 66–67° C. at 0.1 mm. Hg
    Colorless crystals
    Melting point 49–51° C.
Yield: 29.7 g.=85% of theory.

We claim as our invention:

1. A process for the production of a tropolone which comprises refluxing a 2-halotropone of the formula:

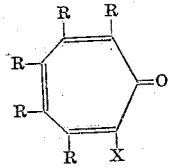

wherein X is a halogen and each R is individually selected from the group consisting of a hydrogen atom and an alkyl group of from 1 to 10 carbon atoms in a solution of formic acid containing 10% to about 50% by weight of water based upon the weight of the formic acid to form the corresponding tropolone in which X is replaced by hydroxyl.

2. A process for the production of tropolone which comprises refluxing 2-halotropone in a solution of formic acid containing 10% to about 50% by weight of water based upon the weight of the formic acid.

3. A process for the production of tropolone which comprises refluxing 2-chlorotropone in a solution of formic acid containing 10% to about 50% by weight of water based upon the weight of the formic acid.

4. A process in accordance with claim 3 wherein the formic acid is present in about 70% to 90% by weight of the solution.

5. A process for the production of tropolone which comprises refluxing by boiling at atmospheric pressure a mixture of 2-chlorotropone in a solution of formic acid containing 10% to about 50% by weight of water based upon the weight of the formic acid.

References Cited in the file of this patent
UNITED STATES PATENTS
2,894,989    Pratt et al. _____ July 14, 1959

OTHER REFERENCES

Nozoe et al.: Chemistry and Industry, pages 66–7, January 15, 1955.